United States Patent [19]

Ogawa et al.

[11] Patent Number: 4,858,108
[45] Date of Patent: Aug. 15, 1989

[54] PRIORITY CONTROL ARCHITECTURE FOR INPUT/OUTPUT OPERATION

[75] Inventors: Tetsuji Ogawa; Masao Kato, both of Hadano, Japan

[73] Assignee: Hitachi, Ltd., Tokyo, Japan

[21] Appl. No.: 838,717

[22] Filed: Mar. 12, 1986

[30] Foreign Application Priority Data

Mar. 20, 1985 [JP] Japan ................................. 60-57029

[51] Int. Cl.[4] ........................ G06F 13/00; G06F 13/14; G06F 13/20; G06F 3/00
[52] U.S. Cl. ................................ 364/200; 364/238.2; 364/238.3; 364/241.2; 364/241.4; 364/242.2
[58] Field of Search ... 364/200 MS File, 900 MS File, 364/300

[56] References Cited

U.S. PATENT DOCUMENTS

| | | | |
|---|---|---|---|
| 3,728,682 | 4/1973 | Helbig, Sr. ............................ | 364/200 |
| 4,028,668 | 6/1977 | Riikonen ............................... | 364/200 |
| 4,060,849 | 11/1977 | Bienvenu et al. ..................... | 364/200 |
| 4,093,981 | 6/1978 | McAllister et al. ................... | 364/200 |
| 4,124,888 | 11/1978 | Washburn ............................. | 364/200 |
| 4,246,637 | 1/1981 | Brown et al. ......................... | 364/200 |
| 4,302,808 | 11/1981 | Zanchi et al. ........................ | 364/200 |
| 4,328,543 | 5/1982 | Brickman et al. .................... | 364/200 |
| 4,394,734 | 7/1983 | Nororen et al. ...................... | 364/200 |
| 4,400,773 | 8/1983 | Brown et al. ......................... | 364/200 |
| 4,423,480 | 12/1983 | Bauer et al. .......................... | 364/200 |
| 4,425,615 | 1/1984 | Swenson et al. ..................... | 364/200 |
| 4,546,430 | 10/1985 | Moore et al. ......................... | 364/200 |

FOREIGN PATENT DOCUMENTS

0028335 5/1981 European Pat. Off. ............ 364/200

OTHER PUBLICATIONS

IBM System/370 Extended Architecture Principles of Operation, IBM Publication No. SA22-7085-0, File No. S370-01, First Edition, (Mar. 1983), pp. (13-1) to (13-9).
3081/3083/3084 Processor Complex External Data Controller Introduction/Maintenance (EDC), IBM Publication No. SY22-7087-2, Third Edition, (Sep. 1983), pp. 2, 48-50.

Primary Examiner—Archie E. Williams, Jr.
Assistant Examiner—Robert B. Harrell
Attorney, Agent, or Firm—Antonelli, Terry & Wands

[57] ABSTRACT

An input/output control system includes an external data controller connected to a plurality of input/output units, a central processor, and a main storage accessible from the external data controller and the central processor. The main storage has a storage area corresponding to each input/ouptut unit and a storage area storing information to arrange a queue for a plurality of priority classes for determining the start priority of each input-/output unit. At execution of a start instruction, the central processor sets a control information of the input-/output unit to an associated storage area of the main storage and updates the queue arrangement information. The external data controller starts an input/output unit registered to a queue having the highest priority. The start operation is achieved according to the control information of the input/output unit stored in the main storage.

1 Claim, 10 Drawing Sheets

FIG. 2 PRIOR ART

WORD

| | |
|---|---|
| 0 | INTERRUPTION PARAMETER |
| 1 | SUBCHANNEL CONTROL WORD |
| 2 | CHANNEL PROGRAM ADDRESS |

~103

OPERATION REQUEST BLOCK CONTENTS

FIG. 3 PRIOR ART

WORD

| | | | |
|---|---|---|---|
| 0 | LOCK BYTE | | QUEUE COUNT |
| 1 | TOP OF SUBCHANNEL NUMBER | | BOTTOM OF SUBCHANNEL NUMBER |
| 2 | | | |
| 15 | CH0 | CH1 | CH8 | CH9 |

~104

LOGICAL CU CONTROL BLOCK CONTENTS

SUBCHANNEL BLOCK

—LOGICAL CU BLOCK—

—BLOCK OF SBCHa—

—BLOCK OF SBCHb—

SUBCHANNEL BLOCK CONTENTS

START QUEUE CONTROL BLOCK CONTENTS

LOGICAL CU CONTROL BLOCK CONTENTS

INTERRUPTION QUEUE CONTROL BLOCK CONTENTS

PRIORITY CONTROL ARCHITECTURE FOR INPUT/OUTPUT OPERATION

BACKGROUND OF THE INVENTION

The present invention relates to an input/output (I/O) control system for controlling initiation and interruption of an I/O unit.

Recently, a new concept has been introduced to an I/O channel of a computer. The new idea was outlined and described in detail in Chapter 13 and Chapter 14-17, respectively, of the "IBM System/370 Extended Architechture Principles of Operation (SA22-7085-0)" (to be referred to as literature 1 herebelow).

According to this concept, a channel transferring I/O information is dynamically determined depending on a state of the channel by a channel subsystem.

As an example of computers configured according to the principles described in literature 1 is the IBM-308$_x$ processor including an External Data Controller (EDC) as its channel subsystem. An outline of the operations of this processor has been described in the "IBM Maintenance Library: 3081/3083/3084 Processor Complex External Data Controller Introduction/Maintenance (SY-22-7087-2)" (to be referred to as literature 2 herebelow).

According to the literature 2, a start request of an I/O unit is first held in a logical control unit to which the I/O unit belongs. The EDC searches for the start request in the logical control unit and effects a detected start request. The search operation is conducted through a plurality of logical control units according to a round-robin sequence.

Referring to FIGS. 1-5, the operations will be briefly described herebelow.

FIG. 1 is a schematic block diagram illustrating an entire system in which an EDC 13 is connected via a system controller (SC) 12 to a central processor (CP) 11 and a main storage (MS) 10; moreover, the EDC 13 contains therein a channel (CH) 131 connected to an I/O control unit (CU) 142 by use of a standard interface. In FIG. 1, the CU 142 is connected via switches (SW's) 141 to two channels (CH's) 131. An I/O unit (I/O) 143 is connected to two CU's 142. As shown in this block diagram, a configuration in which an I/O unit is connected to a plurality of CU's will be referred to as a logical control unit (logical CU) herebelow, and a plurality of such logical CU's exist in a system. On the other hand, the MS10 is divided into a program area 101 and a hardware system area (HSA) 102. The program area 101 is used by ordinary programs, namely, as program and data areas; furthermore, an operation request block 103 to be described later is also provided in this area 101. The HSA area 102 is a special area to be accessed by the CP 11 and the EDC 13 and is used to provide therein a logical CU control block 104 and a subchannel block 105 to be described later. These logical CU control and subchannel blocks 104-105 are disposed in correspondence with a plurality of logical CU's and subchannels, respectively. FIGS. 2-4 are schematic diagrams illustrating configuration examples of the operation request block 103, the logical CU control block 104, and the subchannel block 105, respectively described in the literature 2.

According to the new concept of the literature 2, executions of I/O instructions are effected by use of subchannels having a one-to-one correspondence with respect to the I/O's.

A subchannel is kept in an associated subchannel block 105 as information necessary for accomplishing an I/O unit operation of an I/O related to the subchannel. This concept differs from the execution of the conventional I/O instruction as follows.

(1) The control program initiating operation of an I/O unit does not consider the status of the channels. A start instruction is effected with a specified subchannel, and a channel path to the I/O unit is actually selected by the hardware (EDC in this example).

(2) If the path to the I/O is busy, the hardware attempts to search for another path and to initiate operation of the I/O unit. If the hardware cannot detect an available path, the hardware keeps the start request and waits for an available path.

In FIG. 1, the I/O initiate processing is accomplished as follows. The CP 11 fetches a control program from the MS 10 for execution. If the fetched instruction is an I/O initiate instruction (Start Subchannel (SSCH) instruction), the contents of the operation request block 103 of FIG. 2 are transferred to the subchannel block 105 corresponding to the subchannel specified by the SSCH instruction. The operation request block 103 contains information such as a channel program (CCW) address. FIG. 4 is a schematic diagram illustrating a configuration example of a subchannel block in which S and I are bits indicating a start and an interruption, respectively. The contents of the transferred operation request block 103 are stored in a portion of a store area storing the subchannel control information. Another area of the subchannel control information store area is beforehand loaded with fixed information including an ISC, a logical CU number, etc. for an I/O unit. The logical CU number indicates an address of a logical CU to which an I/O unit associated with the pertinent subchannel belongs. When the operation request block 103 is transferred, an I/O start request is enqueued to the related logical CU based on the logical CU number.

A method for enqueuing the I/O start request to the CU is as follows. A top of subchannel number and a bottom of subchannel number of the subchannels waiting for a start request are stored in the logical CU control block 104, a next chained subchannel number is stored in the subchannel block 105, and the S bit indicating that a start request is being held is set to "1", thereby forming a queue chain.

FIG. 5 is a schematic diagram depicting a case in which two start requests are enqueued to a logical CU block and the queue count indicates "2" accordingly.

Among the subchannels waiting for a start request, when the top of subchannel is subchannel a and the next subchannel is subchannel b, the top of subchannel number in the logical CU block 104 indicates the subchannel a; moreover, the next subchannel number in the block of subchannel a indicates the block of subchannel b. Since a logical CU includes a plurality of I/O's, a queue may be formed in a logical CU block as shown in this example. Furthermore, a plurality of logical CU's are contained in the overall system and a queue of I/O start requests is created in each logical CU block.

The EDC 13 has a function to dequeue the queue thus created and to actually start the I/O 143. The EDC 13 accesses the MS 10 to read and update the subchannel block 105 and the logical CU control block 104. Since these blocks are accessed by the CP 11 and EDC 13, there is provided in a portion of the MS 10 the HSA area 102 for storing these blocks. The HSA area 102 is separated from the area 101 used by ordinary programs. As shown in FIGS. 3-4, the blocks 104-105 each have an area represented as "lock byte", which is used to prevent a contention between the accesses from the CP 11 and the EDC 13.

The EDC 13 cyclically effects a read operation for a plurality of logical CU control blocks and checks to determine whether or not the fetched logical CU control block has a subchannel registered to a queue. If this is the case (queue count $\neq 0$), the EDC 13 executes a start operation by use of the top of subchannel number; otherwise, the EDC 13 reads the next logical CU control block and repeats the same processing.

When the EDC 13 fetches a queue, an I/O unit is initiated according to the subchannel control information in the subchannel block 105 and the channel address ($CH_0$, $CH_1$, $CH_8$, and $CH_9$ of FIG. 3) in the logical CU control block 104. If the paths of all channels are busy, the request is enqueued agained.

Although the I/O start requests in the queue are executed in a sequence depending on the SSCH instruction execution order and the logical CU number, there does not exist a clear priority for the execution. On the other hand, the control program controls the I/O operation with a priority assigned thereto; however, such a priority processing is not considered after the start instruction is once issued in the foregoing example.

Although a concept of a priority processing was adopted for an I/O interruption after a completion of an I/O processing, the conventional examples have not been flexible enough for the priority specification.

SUMMARY OF THE INVENTION

It is therefore an object of the present invention to effect the I/O start and interruption processing in accordance with the emergency level thereof in a channel subsystem so as to increase the system processing efficiency.

The present invention is characterized in that the pending I/O processing requests in a queue each are identified by a class assigned thereto depending on the emergency level so that the start and interruption processing of the I/O request is achieved by the channel subsystem according to the class.

Conventionally, this type of priority control was effected at an I/O control program level; however, as can be seen from the concept of "Extended Architecture" described in the literature 1, when the I/O start requests are held in the hardware called channel subsystem, the priority control at the program level becomes incomplete. If the priority is assigned only to physical units such as I/O's (subchannels), a paging data set and another data set may exist in a disk unit, which is not preferable for the system performance. In the example described above, the priority of I/O processing for accessing the paging data set should be higher than that of the I/O processing for accessing the ordinary data set. That is, even for an I/O, the I/O processing emergency level must vary depending on the I/O processing request source. The present invention satisfactorily meets these requirements.

BRIEF DESCRIPTION OF THE DRAWINGS

The present invention will be apparent from the following detailed description taken in conjunction with the accompanying drawings in which:

FIG. 2 is a diagram illustrating the format of an operation request block in the main storage;

FIG. 3 is a diagram depicting the format of a logical CU control block in the main storage;

DESCRIPTION OF THE PREFERRED EMBODIMENT

Referring to FIGS. 6-15, an embodiment of the present invention will be described.

Figure 6:
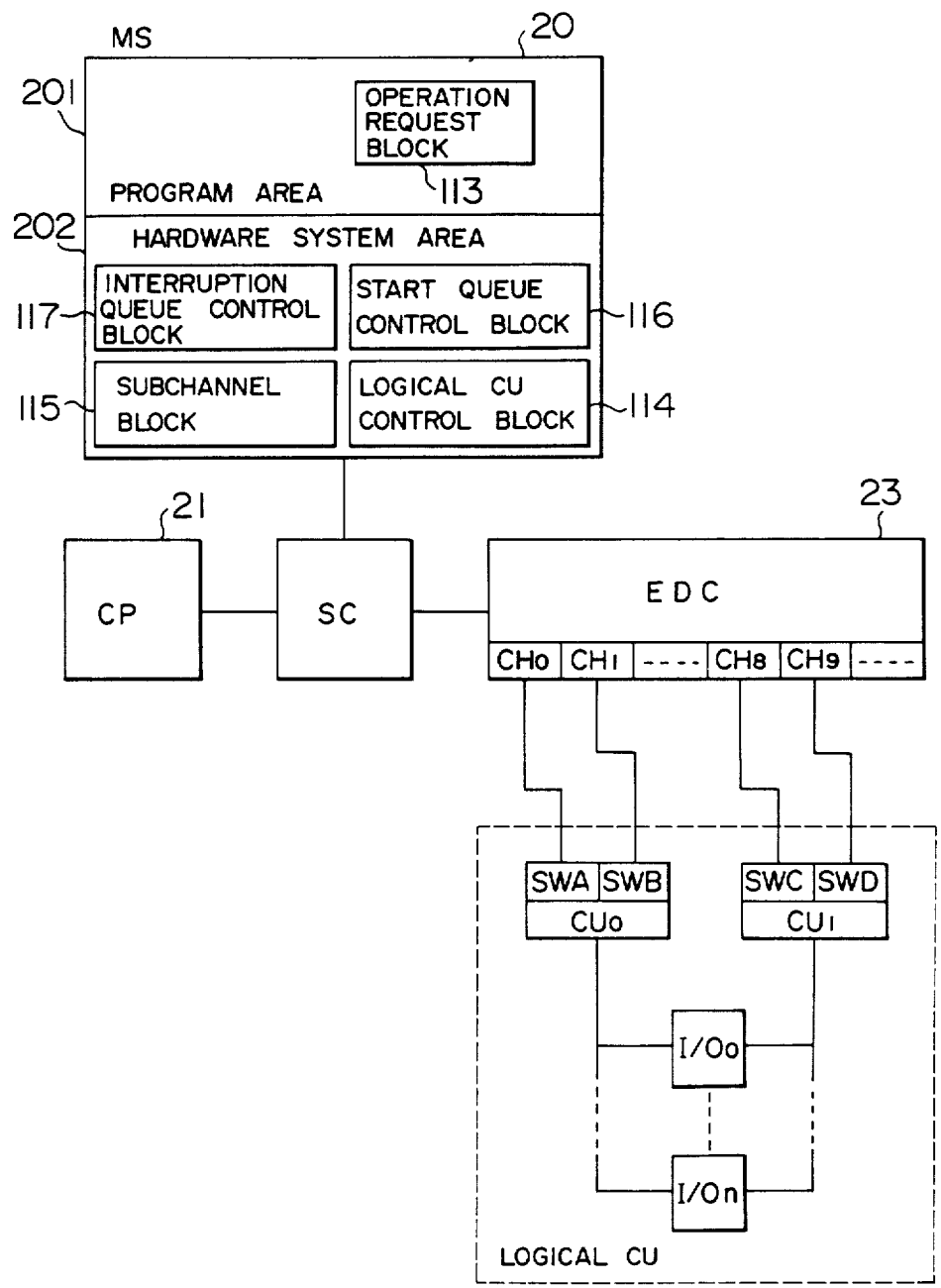
FIG. 6 is a diagram illustrating the overall configuration of a system according to the present invention.

FIG. 6 is a schematic block diagram illustrating the overall system according to the present invention. Although the system configuration is similar to that of FIG. 1, the contents of each block disposed in the main storage 20 are different as will be described later. A start queue control block 116 and an interruption queue control block 117 are included in the main memory of the present invention. The processing in the CP 21 and the EDC 23 is different from that in the CP 11 and the EDC 13 in FIG. 1 as will be described later in connection to FIGS. 11-12 and 15-16.

Figure 1:
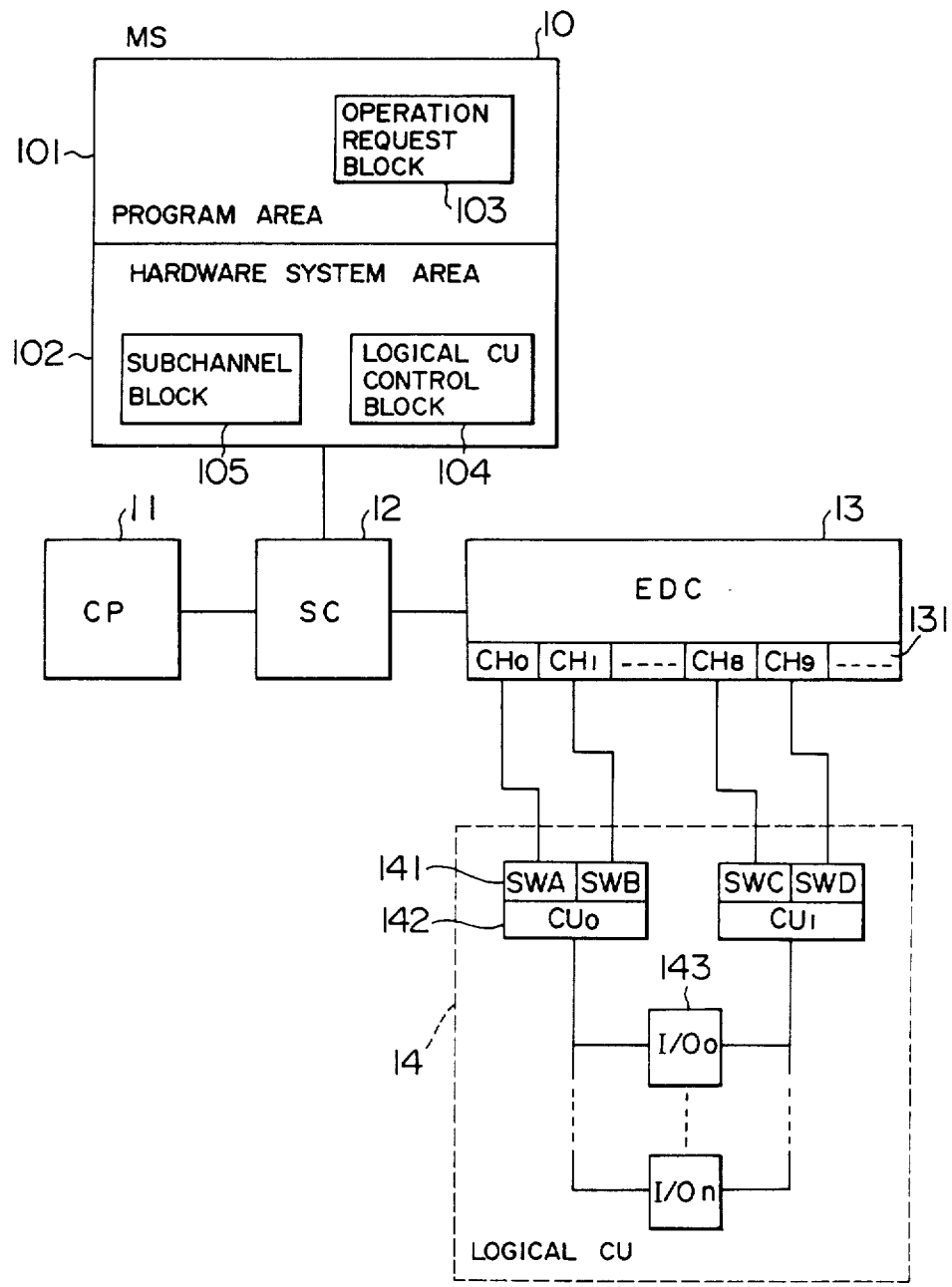
FIG. 1 is a schematic diagram illustrating the overall configuration of the prior art system.

The system controller (SC) and the logical CU are the same as those of FIG. 1.

Figure 7:
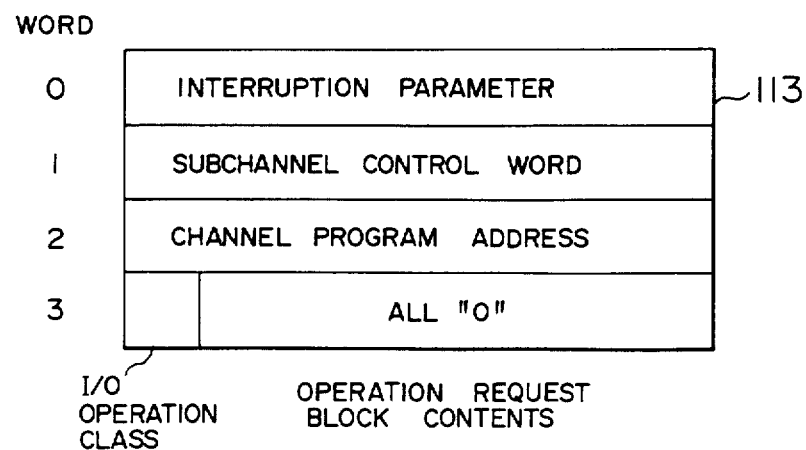
FIG. 7 is a diagram illustrating the format of an operation request block of the present invention.

FIG. 7 is a diagram illustrating a configuration example of an operation request block 113 of the present invention which differs from the prior art example of FIG. 2 in that an I/O operation class C is added to the content of word 3. The bit allocation of the class C is as follows in which the effective class code comprises three bits.

Bit 0: "0"
Bit 1: Class code 0
Bit 2: Class code 1
Bit 3: Class code 2

The class codes 0-2 each are decoded to specify classes 0-7, namely, a class code of "000" indicates the highest I/O operation class 0, whereas a class code of "111" represents the lowest I/O operation class 7.

Figure 4:
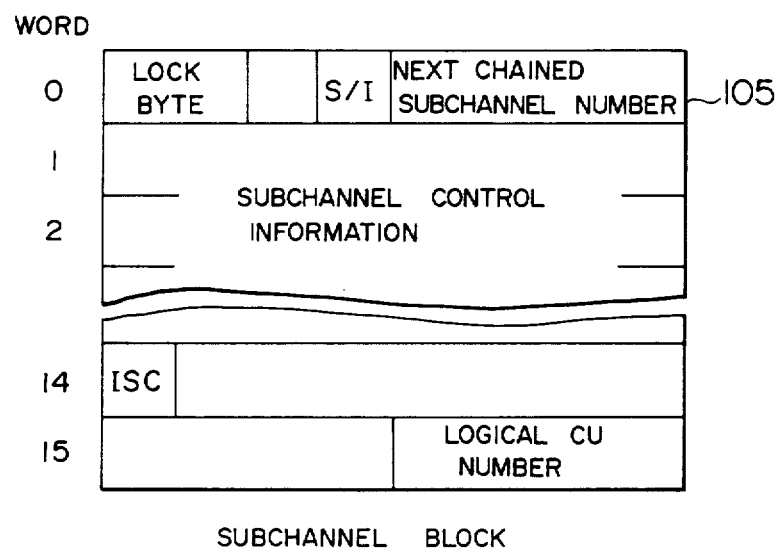
FIG. 4 is a diagram showing the format of a subchannel block in the main storage.
Figure 5:
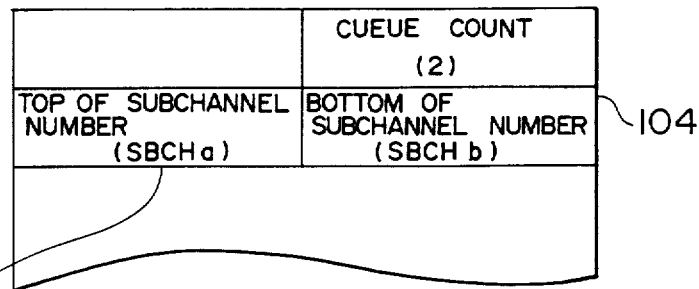
FIG. 5 is a diagram demonstrating the conventional block chain in the main storage.
Figure 5:
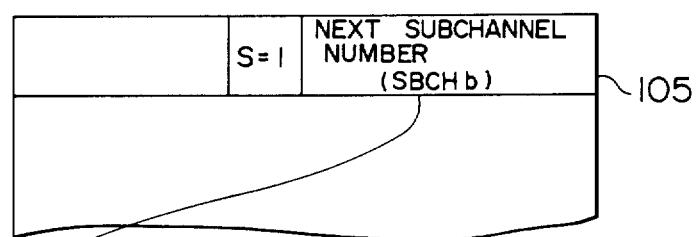
Figure 5:
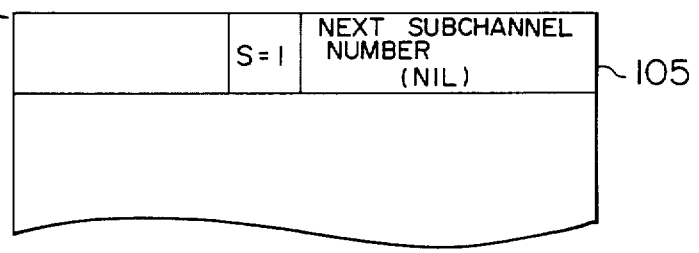
Figure 8:
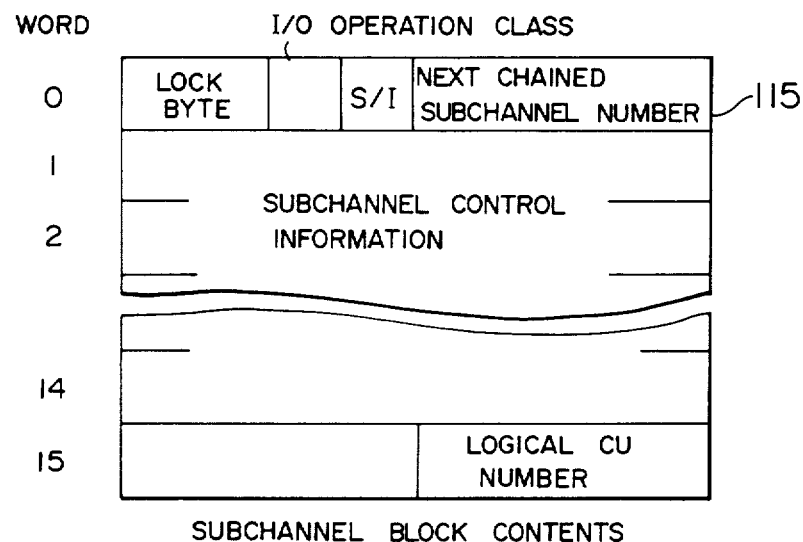
FIG. 8 is a diagram depicting the format of a subchannel block of the present invention.

FIG. 8 is a diagram illustrating a subchannel block 115 according to the present invention which is different from the prior art example of FIG. 4 in that an area for storing the I/O operation class C is added.

Figure 9:
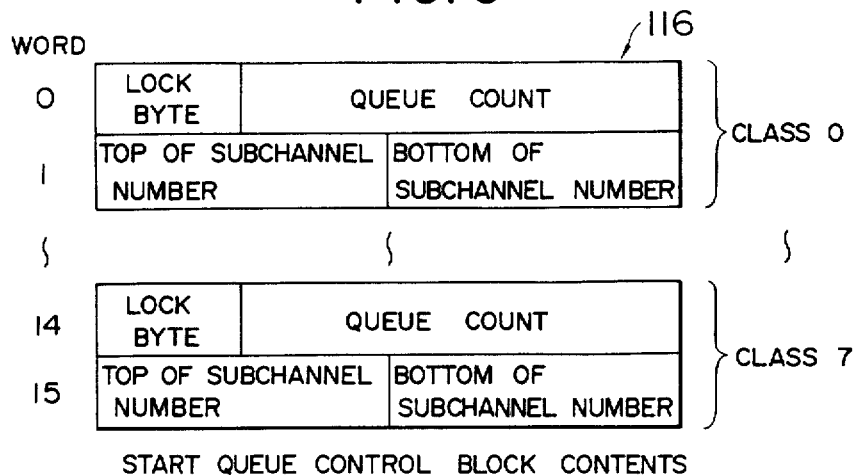
FIG. 9 is a diagram showing the format of a start queue control block of the present invention.

FIG. 9 is a diagram showing the format of a start queue control block controlling an I/O unit and comprises a queue for each operation class, the top of queue pointer (top of subchannel number), and the bottom of queue pointer (bottom of subchannel number). The start queue control block is located in an HSA 202 of the MS 20.

Figure 10:
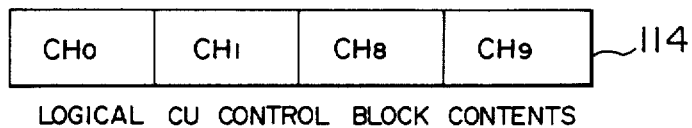
FIG. 10 is a diagram illustrating the format of a logical CU control block of the present invention.
Figure 13:
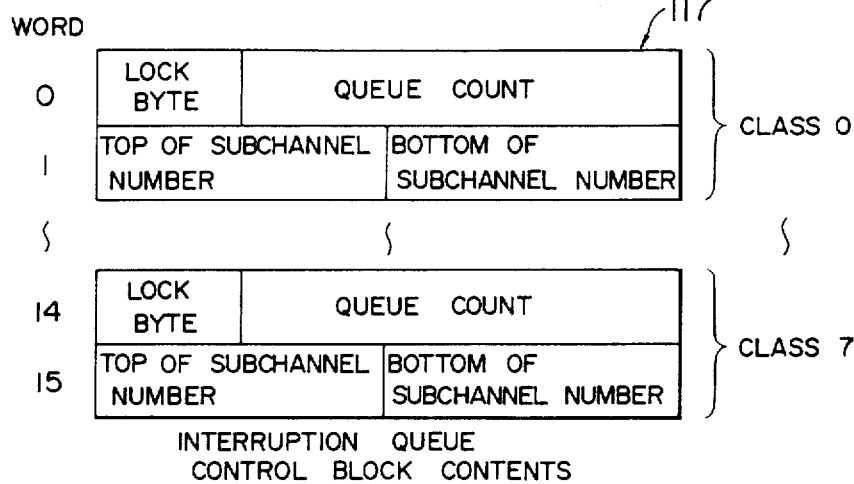
FIG. 13 is a diagram illustrating the format of an interruption queue control block of the present invention.

As shown in FIG. 10, the logical CU control block is reduced in size so as only to keep a channel address and is placed in the HSA area 202.

Figure 11:
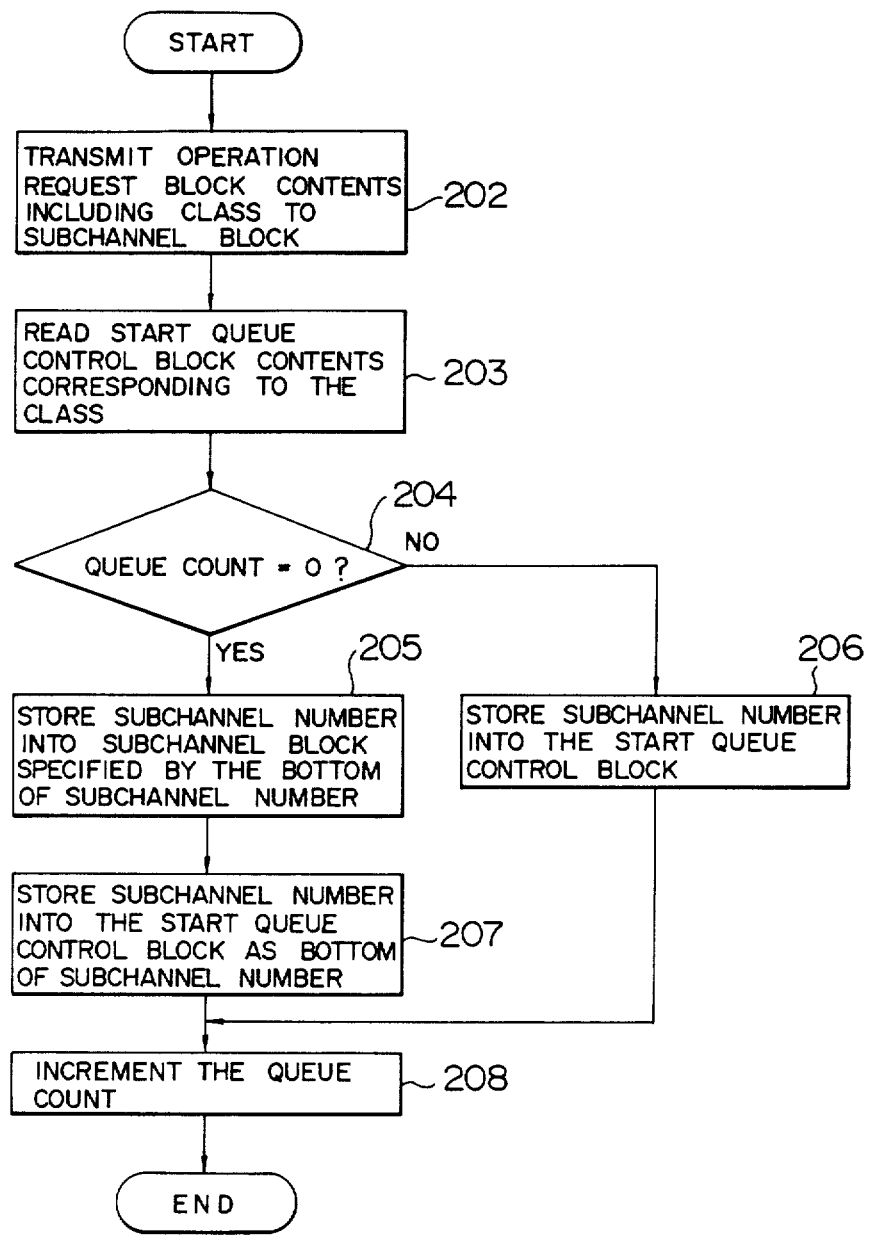
FIG. 11 is a flowchart showing an operation flow of the CP 21.

Referring now to FIGS. 6 and 11, a concrete operation will be described.

When an SSCH instruction is executed, the CP 21 transfers the contents of the operation request block 113, FIG. 7 from the MS 20 to the specified subchannel block 115, FIG. 8 (step 202). Unlike the prior art example, the value of the I/O operation class C added as the new feature is set to the subchannel block 115. Moreover, the CP 21 reads a start queue control block (FIG. 9) associated with the I/O operation class (step 203) and enqueues the I/O start request. If the queue for the operation class does not include any I/O start request (step 204), the areas of the top and bottom subchannel numbers of the start queue control block for the I/O operation class are loaded with the subchannel number to be enqueued (step 206), the queue count is updated from "0" to "1" (step 208), and the S bit of the subchannel block 115 is set to "1".

If a start request is issued to a subchannel having the same processing class in this situation, the CP 21 reads the corresponding start queue control block (FIG. 9) from the HSA area 202 of the MS 20 (step 203), stores the started subchannel number in the next chained subchannel number area of the subchannel control block (FIG. 8) indicated by the bottom of subchannel number (step 205), stores the started subchannel number in the area of bottom of subchannel number in the start queue control block (step 207), and increments the queue count by one (step 208), thereby establishing the queue chain. The S bit of the pertinent subchannel block is set to "1".

Figure 12:
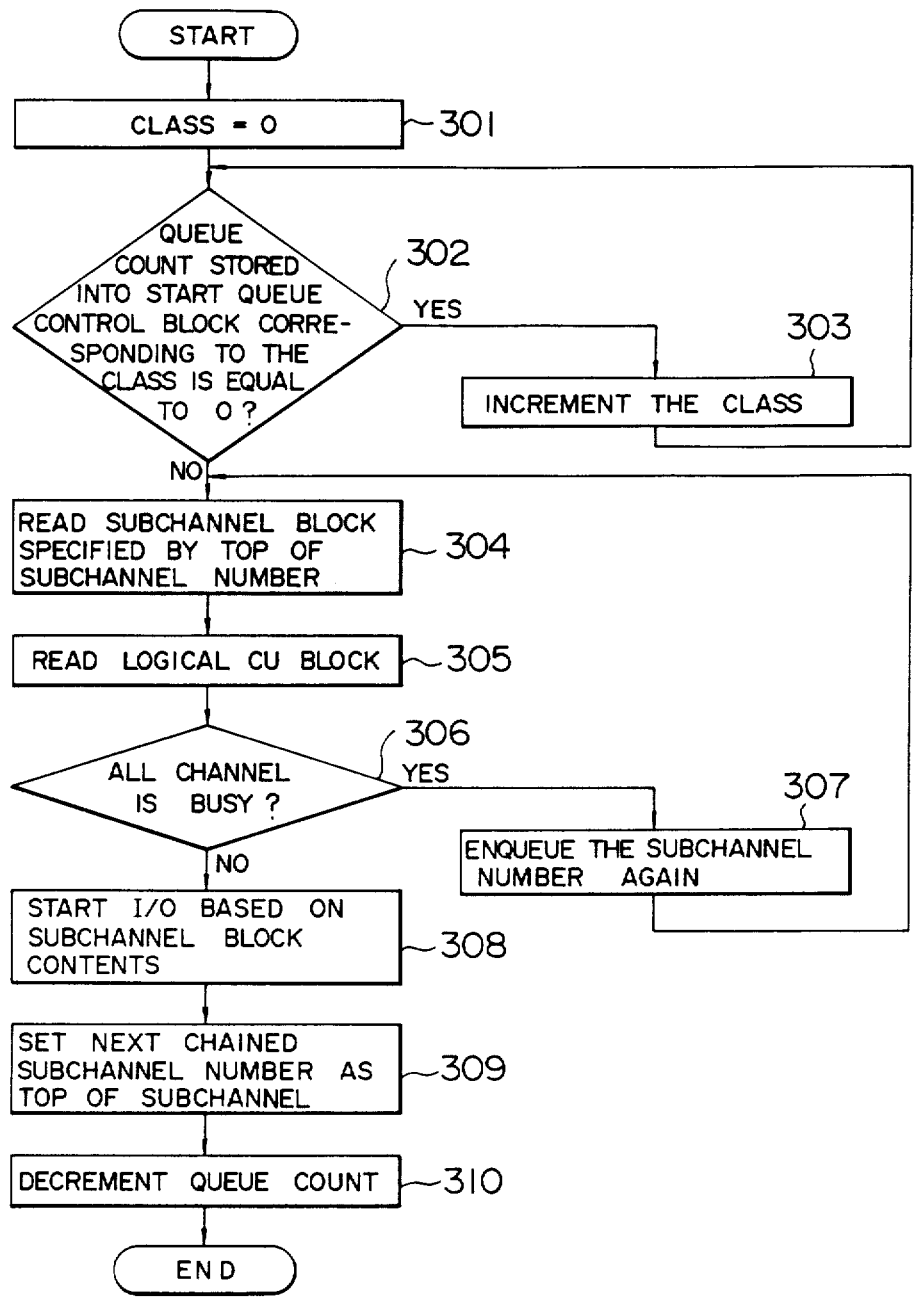
FIG. 12 is a flowchart illustrating an operation flow of the EDC 23.

As described above, the I/O start request enqueued depending on the I/O operation class is dequeued by the EDC 23. This operation is shown in FIG. 12. That is, the EDC 23 first reads a start queue control block (FIG. 9) having an I/O operation class 0 assigned with the highest priority (step 301) from the HSA 202 of the MS 20 and determines the presence or absence of a queue by use of the queue count value (step 302). If the value is not all "0", a subchannel block 115 (FIG. 8) indicated by the top of subchannel number is read (step 304). Based on the logical CU number in the obtained subchannel block 115 (FIG. 8), the EDC 23 reads a channel address by reference to the logical CU control block (FIG. 10) (step 305). The I/O operation is executed by use of the subchannel control information in the subchannel block 115 (FIG. 8) thus obtained and the channel address in the logical CU control block (FIG. 10) (step 308). If all channel paths are busy (step 306), the request is enqueued again (step 307). Namely, the I/O start request which cannot be effected is moved to the last location of the queue and the next chained I/O start request is set to the first location of the queue.

When an I/O request is executed, the next chained subchannel number in the subchannel block is moved to the area of the top of subchannel number in the start queue control block (step 209) and the queue count is decremented by one, thereby completing a dequeue operation in response to an I/O start request. For another dequeue operation, the EDC 23 effects the operation beginning from a queue having the I/O operation class 0. Since the EDC 23 operates independently of the CP 21, a queue having a higher I/O operation class may be created by the CP 21 while the EDC 23 is achieving a dequeue operation in some cases. However, as described in conjunction with the embodiment, the dequeue operation is effected beginning from a queue having the highest I/O operation class; consequently, the priority of the start operation is preserved.

In contrast to the conventional system in which a plurality of logical CU's are simply subjected to a cyclic start operation as described above, the subchannel start operation can be achieved according to the priority of the operation class specified by an SSCH instruction in accordance with the present invention, which allows an I/O operation having a higher emergency level to be preferentially executed, and hence the subsystem processing performance is increased when compared with the prior art system. Particularly, the priority can be altered for each I/O operation request, the priority processing is improved.

The processing described above enables the priority processing for the I/O start operation. The following paragraphs will describe an I/O interruption in detail.

In the I/O interruption processing of the computer described in the literature 2, a predetermined interruption subclass is set to each subchannel when an initial program load (IPL) operation takes place in the computer. Namely, the subclass information is written in an ISC area of a subchannel block (FIG. 4). When an I/O interruption request is issued for an associated subchannel from an I/O for which the I/O start has been effected, an interruption queue is registered to an interruption queue control block corresponding to the interruption subclass (ISC of FIG. 4) preset in advance during the IPL operation. This is accomplished by the EDC 13. The format and meaning of the ISC are the same as those of the I/O operation class of the present invention; however, the ISC functions only for an I/O interruption. Although the format and operation method of the interruption queue control block are identical to those of the start queue described above, the dequeue operation is accomplished by the CP 11 in the prior art system. In addition, when a subchannel is registered to an interruption queue, the I bit of the associated subchannel block is set.

According to the present invention, the I/O interruption queue is controlled by use of the I/O operation class. The I/O operation class is specified when the subchannel is initiated, that is, the priority can be more dynamically specified as compared with the prior art ISC.

Figure 14:
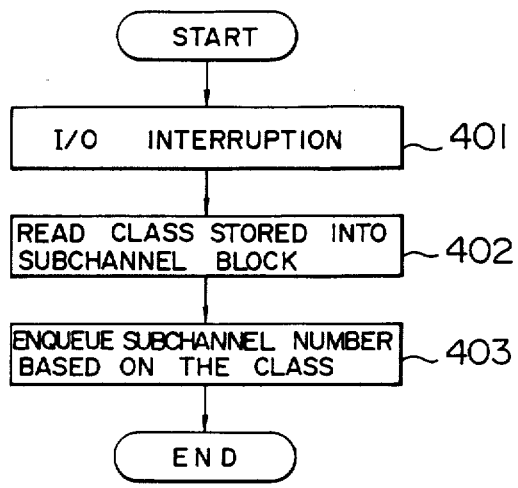
FIG. 14 is a flowchart depicting an operation flow of the EDC 23.
Figure 15:
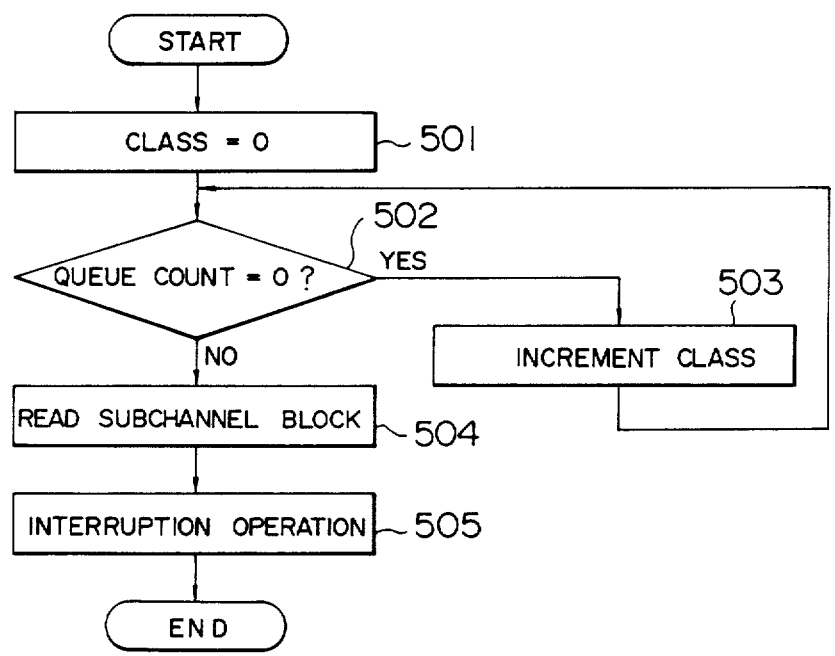
FIG. 15 is a flowchart illustrating an operation flow of the CP 21.

The I/O interruption operation is shown in FIGS. 14-15.

When an I/O interruption request occurs (step 401), the EDC 23 references an I/O operation class in the subchannel block (FIG. 8) corresponding to the I/O (step 402). The I/O operation class is beforehand specified at the I/O start request. The I bit is set in the reference operation. The EDC 23 reads an interruption queue control block (FIG. 13) prepared in the HSA 202 of the MS 20 corresponding to the referenced class and enqueues the I/O interruption request (step 403). The enqueue operation is the same as the operation enqueuing the I/O start request.

The I/O interruption request enqueued according to the I/O processing class is dequeued by the CP 21. Namely, the CP 21 first reads the interruption queue control block (FIG. 13) having the I/O operation class 0 assigned with the highest priority (step 501) and determines the presence or absence of a queue by use of the queue count value (step 502). If the value is not all "0", a subchannel block indicated by the top of subchannel number is read (step 504). Based on the information in the obtained subchannel block, the CP 21 conducts an interruption processing (step 505).

When the queue count is all "0", the interruption processing is effected on a queue having an I/O operation class assigned with the next highest priority (step 503).

A description will be made of a method for setting the I/O operation class.

Assume that a computer system with a virtual storage in which a disk unit is disposed as an I/O and a data set for the paging operation and a data set for the user are stored in the disk unit. A control program generates two operation control blocks which should be prepared within the program area 201 (not shown in FIG. 6) in advance for the disk unit. The contents of each operation control block is almost the same as those of the operation request block 113 of FIG. 7.

One of the operation control blocks is used for the paging operation, and hence "0" is set to the I/O operation class; whereas, the other operation control block is used for the user and the I/O operation class is thus set to "1".

When an address translation exception (which occurs when an address not found in the main storage is accessed) takes place during an execution of a user program, the control program controlling execution of ordinary user programs transfers the paging control block to the operation request block 113 (FIG. 7) and issues an SSCH instruction. If a user program desires to request a user data set, the control program transfers the user control block to the operation request block 113 (FIG. 7) and issues an SSCH instruction.

For the processing of the user control block, the hardware of the CP 21 constructs a queue, and the EDC 23 performs a dequeue operation.

Consequently, the paging data set is preferentially read from the disk unit with a higher priority as compared with the user data set.

The I/O operation class as described above can be set by the control program in advance to an area of the operation control block prepared according to the characteristic of the I/O start request.

According to another method for setting an I/O operation class, an operation control block may be disposed for each user, for example. That is, the higher priority I/O classes are assigned to the computer users related to jobs having the higher emergency levels.

According to still another method for setting an I/O operation class, each program stored in the disk unit may be assigned with an I/O operation class. Namely, an operation control block having the highest priority I/O operation class is prepared for a failure processing program, and when a failure occurs, the disk unit is activated by use of the operation control block.

Various methods for setting an I/O operation class can be considered in addition to those described above.

While the present invention has been described with reference to the particular illustrative embodiment, it is not to be restricted by the embodiment but only the appended claims. It is to be appreciated that those skilled in the art can change or modify the embodiment without departing from the scope and spirit of the present invention.

We claim:
1. An input/output control system comprising:
(a) a plurality of input/output means;
(b) a main storage including:
  (i) a respective first storage area having a plurality of areas corresponding to said plurality of input/output means, for storing control information in each area of said first storage area corresponding to an input/output means, and
  (ii) a second storage area for storing first information in a form of a start queue in a plurality of areas of said storage areas corresponding to a plurality of classes, said start queue indicating a respective start priority for each of said input/output means;
(c) a central processing unit connected to said main storage and responsive to a start request specified by a program for providing control information necessary to start operation of a requested input/output means and a class code indicating a start priority of said requested input/output means to said first storage area of said main storage, and for updating said second storage area of said main storage so as to register first information indicating said requested input/output means to a predetermined area of said start queue corresponding to one of said plurality of classes indicated by said class code; and
(d) external data control means connected to said plurality of input/output means, said central processing unit and said main storage for reading first information from said start queue having a highest start priority, for reading from said main storage control information of a requested input/output means corresponding to said first information, and for initiating operation of said requested input/output means based on said control information;
(e) wherein said main storage further includes a third storage area for storing second information in an interruption queue having a plurality of areas corresponding to said plurality of classes indicating respective priorities of interruption requests from said plurality of input/output means;
(f) wherein said external data control means being responsive to an interruption request from an input/output means in a start state for referencing the class code provided to said first storage area of said main storage and for updating said third storage area so as to register said first information indicating said input/output means to the interruption queue corresponding to the class indicated by said class codes; and
(g) wherein said central processing unit operating to read said first information indicating an input/output means from an interruption queue having a highest priority and for effecting an interruption processing for said input/output means.

* * * * *